United States Patent [19]

Schmidt

[11] Patent Number: 4,729,733
[45] Date of Patent: Mar. 8, 1988

[54] DUAL FEED SINGLE CAVITY INJECTION MOLDING SYSTEM

[75] Inventor: Harald H. Schmidt, Georgetown, Canada

[73] Assignee: Mold-Masters Limited, Georgetown, Canada

[21] Appl. No.: 22,041

[22] Filed: Mar. 5, 1987

[30] Foreign Application Priority Data

Oct. 30, 1986 [CA] Canada ................................. 521873

[51] Int. Cl.⁴ ........................................... B29C 45/73
[52] U.S. Cl. ............................. 425/549; 264/328.15;
425/566; 425/571; 425/DIG. 227
[58] Field of Search ................ 425/130, 549, 564, 566,
425/568, 571, 572, 573, 562, 467, DIG. 227;
264/328.15, 328.1, 328.9; 251/330; 219/421,
424, 541, 544

[56] References Cited

U.S. PATENT DOCUMENTS

| | | | |
|---|---|---|---|
| 3,037,245 | 6/1962 | Darnell | 425/562 |
| 4,026,518 | 5/1977 | Gellert | 251/330 |
| 4,222,733 | 9/1980 | Gellert et al. | 425/566 |
| 4,268,240 | 5/1981 | Rees et al. | 425/549 X |
| 4,286,941 | 9/1981 | Gellert | 425/566 |
| 4,378,963 | 4/1983 | Schouenberg | 425/549 |
| 4,380,426 | 4/1983 | Wiles | 425/566 |
| 4,446,360 | 5/1984 | Gellert | 219/421 |
| 4,579,520 | 4/1986 | Gellert | 425/566 X |
| 4,609,138 | 9/1986 | Harrison | 425/572 X |
| 4,663,811 | 5/1987 | Gellert | 425/549 X |
| 4,682,945 | 7/1987 | Schad | 425/549 |

Primary Examiner—Richard L. Chiesa
Attorney, Agent, or Firm—Riches, McKenzie & Herbert

[57] ABSTRACT

This invention relates to a manifold housing for a valve gated single cavity injection molding system. The heated manifold housing has a dome portion and a base portion which is secured to a heated nozzle with aligned central bores through which the valve pin extends. Hydraulic actuating mechanism is mounted inside the manifold housing to reciprocate the valve pin between open and closed positions. The melt duct in the manifold branches from a central inlet into two separate arms with smoothly curved bends which extend to join the central bore on opposite sides of the valve pin. Providing two streams of melt which meet at the valve pin avoids the problem of streaking and slow melt flow on one side of the valve pin.

7 Claims, 2 Drawing Figures

DUAL FEED SINGLE CAVITY INJECTION MOLDING SYSTEM

BACKGROUND OF THE INVENTION

This invention relates to valve gated injection molding, and more particularly to a hydraulically actuated single cavity system with a single inlet in alignment with the valve pin and the gate which provides improved melt flow around the valve pin.

Single cavity injection molding systems with a central inlet are well known in the art. For instance, Gellert U.S. Pat. Nos. 4,026,518 entitled "Bushing Seal for Valve-Gated Injection Mold" which issued May 31, 1977, 4,222,733 entitled "Injection Molding Flow Control Mechanism" which issued Sept. 16, 1980, and 4,286,941 entitled "Injection Molding Nozzle Seal" which issued Sept. 1, 1981 all disclose mechanically actuated systems. More recently, the applicant's U.S. Pat. No. 4,380,426 entitled "Injection Molding Valve Pin Direct Pneumatic Actuator" which issued Apr. 19, 1983 discloses a pneumatically actuated system. Of course, as shown in all of the previous systems, it is necessary that the melt flow passage be offset around at least part of the actuating mechanism which engages the driven end of the valve pin. The melt passage then extends diagonally to join the central bore through the nozzle and the melt flows along the valve pin to the gate. As described in U.S. Pat. No. 4,026,518 mentioned above, a valve bushing is often used to facilitate the manufacture of structure wherein the melt passage joins the valve pin bore.

This previous arrangement wherein the melt passage joins the valve pin bore at an angle is suitable for many applications. However, when molding some materials such as white polyvinyl chloride the pattern of flow of the melt from the melt passage around the valve pin creates discoloured streaks where the flow joins again on the other side. This also delays the elimination of the previous coloured melt when making colour changes because there is slower melt flow on the side of the valve pin opposite the melt passage inlet.

SUMMARY OF THE INVENTION

Accordingly, it is an object of the present invention to at least partially overcome these disadvantages by providing a manifold housing for a single cavity injection molding system wherein the melt flow is directed to the valve pin bore on opposite sides of the valve pin.

To this end, in one of its aspects, the invention provides a valve gated single cavity injection molding system having a heated nozzle seated in a cavity plate with an elongated valve pin having a driven end and a tip end mounted in a central bore in the nozzle, and a melt passage for conveying melt from a central inlet to a gate in a cavity plate leading to a cavity, the melt passage extending around the valve pin in the central bore of the nozzle which is in alignment with the central inlet and the gate, the improvement wherein a heated hollow manifold housing is seated in a mold back plate, the manifold housing having a dome portion and a base portion, the dome portion having the central inlet therein, the base portion extending between the heated nozzle and the dome portion and having a valve pin bore extending therethrough, the valve pin bore having a first portion and a second portion, the first portion having a substantially uniform diameter to snugly receive the valve pin therethrough, the second portion having a larger diameter than the first portion and extending in alignment from the first portion to an outlet connecting to the central bore of the nozzle, the manifold housing having a melt duct which forms a portion of the melt passage and extends from the central entry to the join between the first and second portions of the valve pin bore, the melt duct in the manifold housing branching into at least two arms which extend to connect to the valve pin bore on opposite sides thereof, and hydraulic valve pin actuating mechanism is mounted inside the manifold housing, the actuating mechanism including a cylinder securely mounted inside the dome portion of the manifold housing with an insulative air space between them, a piston located in the cylinder and operatively connected to the driven end of the valve pin, and hydraulic fluid ducts connected to the cylinder on opposite sides of the piston, whereby the valve pin is reciprocated between a retracted open position and a closed position wherein the tip end of the valve pin is seated in the gate.

Further objects and advantages of the invention will appear from the following description taken together with the accompanying drawings

DETAILED DESCRIPTION OF THE DRAWINGS

Figure 1:
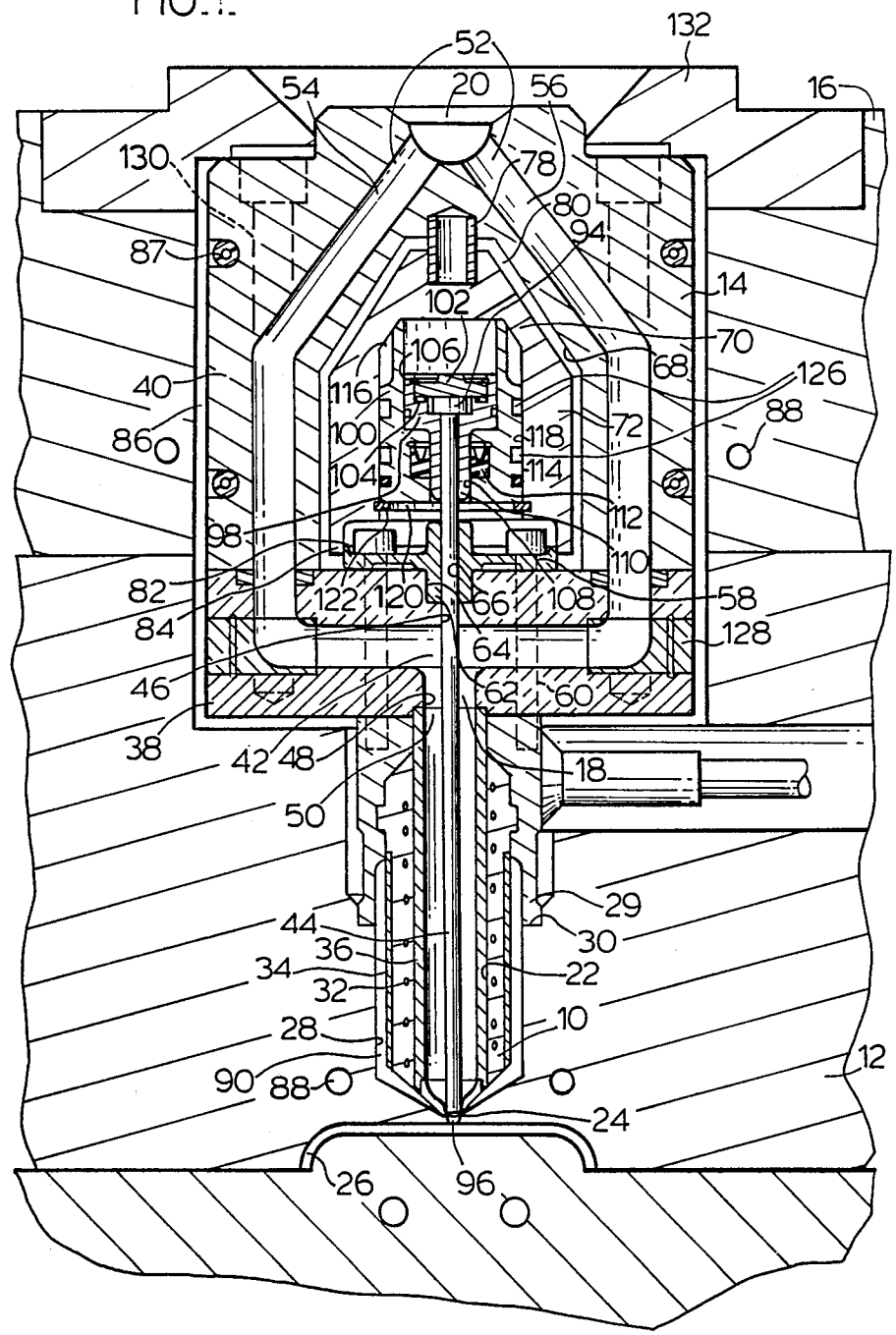
FIG. 1 is a sectional view of a portion of a single cavity valve gated injection molding system having a manifold housing according to a preferred embodiment of the system.

Reference is first made to FIG. 1 which shows a single cavity valve gated injection molding system having a heated nozzle 10 seated in the cavity plate 12 and a heated manifold housing 14 seated in the mold back plate 16. As may be seen, a melt passage 18 extends through the manifold housing 14 from a central inlet 20 to a central bore 22 through the nozzle 10, to a gate 24 leading through the cavity plate 12 to a cavity 26. This is described in greater detail below.

The nozzle 10 is seated in a well 28 in the cavity plate 12. The nozzle has a locating bushing portion 29 which sits against a circumferential shoulder 30 to accurately locate the nozzle 10 in place. In the embodiment shown, the heated nozzle 10 is made as described in U.S. Pat. No. 4,446,360 to Gellert entitled "Spruce Bushing Connector Assembly" which issued May 1, 1984. An electrical helical heating element 32 is cast in copper between a stainless steel outer portion 34 and a stainless steel inner portion 36 which forms the central bore 22. The heated nozzle could also be made by the method described in Gellert Canadian patent application Ser. No. 496,645 entitled "Manufacturing Method for Selected Gate Configuration Injection Molding Nozzles" filed Dec. 2, 1985.

As may be seen, the hollow manifold housing is made of steel with a base portion 38 and a dome portion 40. The base portion 38 has a central valve pin bore 42 extending therethrough to receive the valve pin 44 which also extends through the central bore 22 of the nozzle 10. The central bore 42 of the base portion 38 of the manifold housing 14 has a first portion 46 which is drilled to snugly receive the valve pin 44, and an enlarged second portion 48 which extends from the first portion 46 to an outlet 50. The base portion 38 abuts against the heated nozzle 10, with their central bores 22,42 in alignment. The second portion 48 of the central bore 42 of the base portion 38 is equal in diameter to the central bore 22 of the nozzle 10 to continue the melt passage 18.

As described in more detail below, the base and dome portions 38,40 of the manifold housing 14 are made with a melt duct 52 which forms part of the melt passage 18. As can clearly be seen in FIG. 1, the melt duct 52 branches from the central inlet 20 into two arms 54,56 which extend through opposite sides of the manifold housing 14 to the valve pin bore 42 through the base portion 38. The two arms 54,56 meet the valve pin bore 42 where the first portion 46 joins the enlarged second portion 48, and all the corners and bends are smoothly curved to avoid turbulent flow of the melt therethrough. The two arms 54,56 provide two streams of melt flow which meet at the valve pin to avoid tne problems discussed above when the melt flows from one side only.

A valve pin bushing 58 is fastened to the base portion 38 of the manifold housing 14 by bolts 60 which extend into the nozzle 10 to secure them tightly together to prevent leakage. The bushing 58 has a collar portion 62 which is seated in a well 64 in the base portion 38, and a central bore 66 which is equal in diameter to the first portion 46 of the central bore 42 through the base portion 38 to snugly receive the valve pin 44 therethrough. The dome portion 40 of the manifold housing 14 forms a cup 68 in which a central portion 70 of a steel cylinder housing 72 is received. The cylinder housing 72 has wing portions 74 which extend laterally on each side of the central portion 70. Each wing portion 74 extends out through an opening in the manifold housing 14 and is securely fixed to the cavity plate 12 by bolts 76. As may be seen, a cylindrical locating sleeve 78 is seated between the dome portion 40 of the manifold housing 14 and the central portion 70 of the cylinder housing 72. Thus, between the locating sleeve 78 and the wing portion 74 being bolted to the cavity plate 12, the central portion 70 of the cylinder housing 72 is securely mounted inside the dome portion 40 of the manifold housing 14. In this mounted position, there is an insulative air space 80 between the cylinder housing 72 and the manifold housing 14, with no direct contact between them.

The valve pin bushing 58 which is bolted to the manifold housing 14 and the nozzle 10 has an outer flanged portion 82 which extends inside an outer skirt portion 84 of the cylinder housing 72. This laterally locates the manifold housing 14 in a position with another insulative air space 86 between it and the surrounding cavity plate 12 and mold back plate 16. It is critical to the successful operation of the system that the melt be maintained within a narrow temperature range as it flows through the melt passage 18 to the gate 24. Thus, the manifold housing 14 is heated to a predetermined temperature by an electrical heating element 87 which is cast into it. The nozzle 10 is similarly heated by the helical heating element 32. However, the cavity plate 12 and mold back plate 16 are cooled by cooling water flowing through cooling channels 88. Thus, as is well known, it is necessary to separate the cooled components of the system from the heated components. The heated nozzle 10 is seated in the cooled cavity plate 12 with the locating and insulation bushing portion 29 providing an insulative air space 90 between them. Similarly, as described above, the heated manifold housing 14 is mounted with an insulative air space 86 around it. Furthermore, air space 80 is provided between the cylinder housing 72 and the heated manifold housing 14 surrounding it to avoid overheating of the valve pin actuating mechanism described below.

As mentioned above, the valve pin bushing 58 has a central bore 66 which is equal in diameter and in alignment with the first portion 46 of the central bore 42 through the base portion 38 of the manifold housing 14. Thus, they provide a seal against the leakage of melt around the valve pin 44 which extends through them into the central bore 22 of the heated nozzle 10. The elongated valve pin 44 has an enlarged driven end 94 and a tapered tip end 96 which fits in the gate 24. The driven end 94 is connected to hydraulic actuating mechanism which reciprocates it between a retracted open position and a closed position in which the tip end 96 is seated in the gate 24. The actuating mechanism includes a piston 98 which is connected to the driven end 94 of the valve pin 44 and reciprocates inside a cylinder 100. The valve pin 44 extends through the piston 98 and the enlarged driven end is secured to it by cap 102 which is retained in position between a resilient O-ring 104 and a removable resilient retaining or snap ring 106 as described in more detail in the applicant's U.S. patent application Ser. No. 920,779 entitled "Mechanism for Valve Gated Injection Molding with Resilient Retaining Ring" filed Oct. 20, 1986 and now U.S. Pat. No. 4,698,013. The piston 98 has an elongated neck portion 108 which extends into an opening 110 in the cylinder 100. A V-shaped high temperature seal 112 is seated in the cylinder 100 around the neck portion 108 to prevent leakage of pressurized hydraulic fluid between them.

Figure 2:
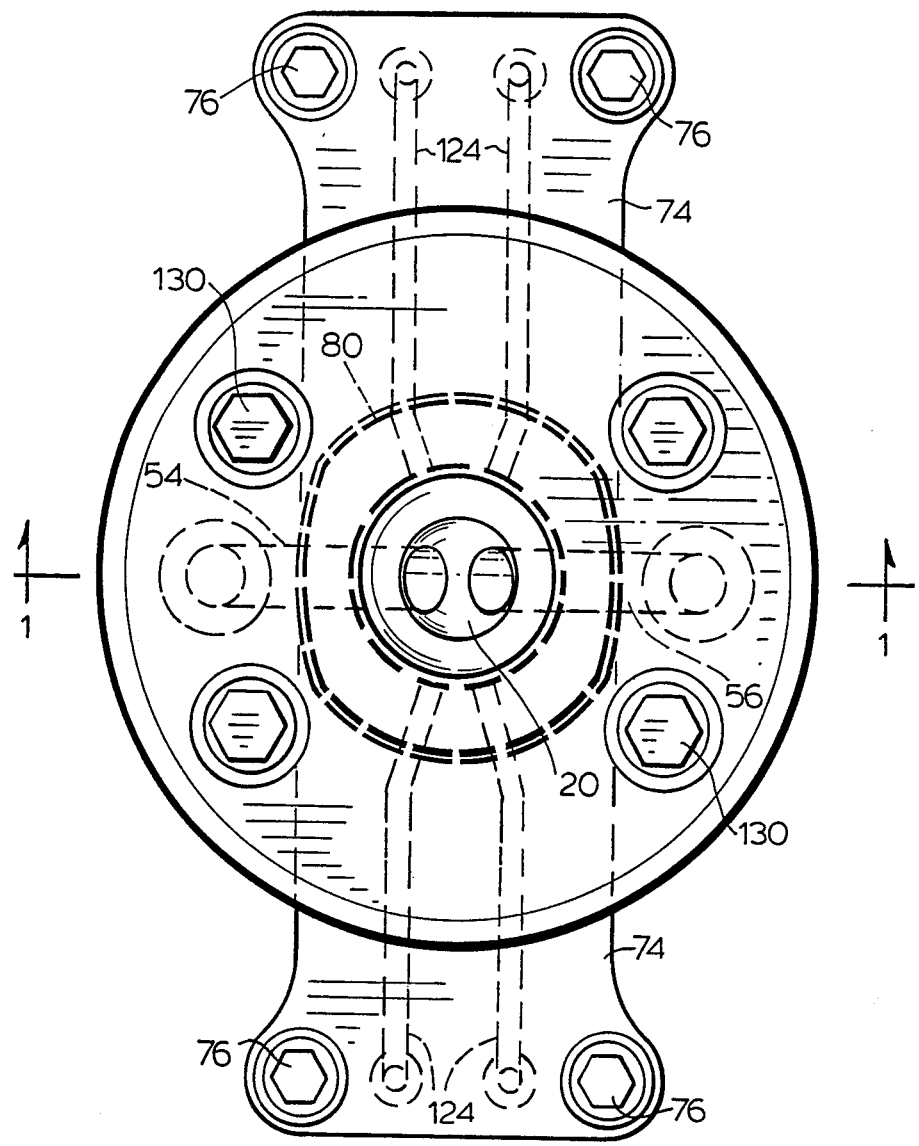
FIG. 2 is a plan view of a portion of the system as seen in FIG. 1.

The cylinder 100 has a generally cylindrical outer surface 114 which is received in a central well 116 in the cylinder housing 72 which has a matching cylindrical inner wall 118. The cylinder 100 is snugly seated in the well 116 and retained in that position by a removable resilient retaining or snap ring 120 which is received in a groove 122 in the wall 118 of the well 116. Pressurized hydraulic fluid is supplied to the cylinder 100 on opposite sides of the piston 98 through ducts 124 from a controlled source (not shown) to reciprocate the piston according to a predetermined cycle. The ducts 124 extend out through the wing portions 74 of the cylinder housing 72 to connect to lines from the hydraulic fluid source. In the embodiment shown, the outer surface 114 of the cylinder is interrupted by grooves which abut against the inner wall 118 of the well 116 to form channels 126 which extend around the cylinder and connect the ducts 124 to openings into the cylinder 100 on opposite sides of the piston 98. As can be seen in FIG. 2, there is an inlet duct and an outlet duct which are connected through the channels 126 to the cylinder 100 on each side of the piston 98. Pressure relief valves (not shown) are connected in the lines to the source of hydraulic fluid to apply a pressure differential between the inlet and outlet ducts. This provides a flow of hydraulic fluid through the ducts 124 and channels 126 which cools the actuating mechanism. This arrangement is described in more detail in the applicant's U.S. patent application Ser. No. 022,042 entitled "Fluid Cooled Hydraulic Actuating Mechanism for Single Cavity Injection Molding" filed on Mar. 5, 1987.

The two arms 54,56 of the melt duct 52 are made in the manifold housing 14 by drilling them before the base and dome portions 38,40 are secured together.

Smoothly curved bends or corners are provided in the base portion 38 by brazing in plugs 128 as described in the applicant's U.S. Pat. No. 4,609,138 entitled "Method of Manufacturing Injection Molding Manifold with Plugs" which issued Sept. 2, 1986. The system is assembled by connecting the piston 98 to the driven end 94 of the valve pin 44 and inserting the piston 98 into the cylinder The cylinder 100 is inserted into the cylinder housing 72 and secured in place by retaining snap ring 120. The tip end 96 of the valve pin 44 is inserted through the central bores of the bushing 58, base portion 38 of the manifold housing 14, and the nozzle 10 which are secured tightly together by bolts 60. The cylinder housing 72 is bolted in place on the cavity plate 12 and the locating sleeve 78 is inserted. The dome portion 40 of the manifold is then tightly secured to the base portion 38 by bolts 130 to prevent leakage from the arms 54,56 of the melt duct 52 where they join. A locating ring 132 is then positioned on the manifold housing 14 and bolted through the mold back plate 16 to the cavity plate 12 to securely retain the nozzle 10 and the manifold housing 14 in position.

In use, the system is assembled as described above and electrical power is applied to the heating element 32 in the nozzle 10 and the heating element 87 in the manifold housing 14 to heat them to a predetermined operating temperature. Pressurized melt is then introduced into the melt passage 18 by a molding machine (not shown) positioned at the central inlet 20. Melt pressure is controlled according to a predetermined cycle in conjunction with the application of controlled hydraulic pressure through the ducts 124 to the actuating mechanism. With the valve pin 44 in the retracted open position, the melt flows through the gate 24 and fills the cavity 26. After the cavity is full, injection pressure is held momentarily to pack and hydraulic pressur is then applied to drive the piston 98 and valve pin 44 to the forward closed position with the tip end 98 of the valve pin 44 seated in the gate 24. The injection pressure is then released and this position is held for a short cooling period before the mold is opened for ejection. After ejection, the mold is closed and hydraulic pressure reapplied to draw the valve pin 44 to the retracted open position. Melt injection pressure is reapplied to refill the cavity, and the molding cycle is repeated continuously every few seconds depending on the size and shape of the cavity and the type of material being molded.

While the description of the manifold housing has been given with respect to a preferred embodiment, it is not to be construed in a limiting sense. Variations and modifications will occur to those skilled in the art. For example, the various components of the system can have different shapes, and different pin actuating mechanism can be used. Reference is made to the appended claims for a definition of the invention.

What is claim is:

1. In a valve gated single cavity injection molding system having a heated nozzle seated in a cavity plate with an elongated valve pin having a driven end and a tip end mounted in a central bore in the nozzle, and a melt passage for conveying melt from a central inlet to a gate in a cavity plate leading to a cavity, the melt passage extending around the valve pin in the central bore of the nozzle which is in alignment with the central inlet and the gate, the improvement wherein,
    (a) a heated hollow manifold housing is seated in a mold back plate, the manifold housing having a dome portion and a base portion, the dome portion having the central inlet therein, the base portion extending between the heated nozzle and ths dome portion and having a valve pin bore extending therethrough, the valve pin bore having a first portion and a second portion, the first portion having a substantially uniform diameter to snugly receive the valve pin therethrough, the second portion having a larger diameter than the first portion and extending in alignment from the first portion to an outlet connecting to the central bore of the nozzle, the manifold housing having a melt duct which forms a portion of the melt passage and extends from the central inlet to the join between the first and second portions of the valve pin bore, the melt duct in the manifold housing branching into at least two arms which extend to connect to the valve pin bore on opposite sides thereof, and
    (b) hydraulic valve pin actuating mechanism is mounted inside the manifold housing, the actuating mechanism including a cylinder securely mounted inside the dome portion of the manifold housing with an insulative air space between them, a piston located in the cylinder and operatively connected to the driven end of the valve pin, and hydraulic fluid ducts connected to the cylinder on opposite sides of the piston, whereby the valve pin is reciprocated between a retracted open position and a closed position wherein the tip end of the valve pin is seated in the gate 2. An injection molding system as claimed in claim 1 wherein the hydraulic fluid ducts include inlet and outlet ducts connected to the cylinder on at least one side of the piston, whereby a hydraulic pressure differential is applied between the inlet and outlet ducts to provide a flow of hydraulic fluid through the inlet and outlet ducts to cool the actuating mechanism.

3. An injection molding system as claimed in claim 1 further including a cylinder housing securely mounted with a central portion extending inside the dome portion of the manifold housing with the insulative air space between them, the cylinder being securely mounted in the cylinder housing.

4. An injection molding system as claimed in claim 3 wherein the cylinder housing has a central well with a cylindrical wall which is slightly larger in diameter than the outer diameter of the cylinder, the cylinder being snugly seated in the well and retained in that position by a resilient retaining ring which is removably received in a groove in the wall of the well.

5. An injection molding system as claimed in claim 3 wherein the cylinder housing has wing portions which extend laterally from opposite sides of the central portion through openings in the manifold housing, the wing portions each being securely fixed to the cavity plate.

6. An injection molding system as claimed in claim 5 wherein first alignment means extend in alignment with the valve pin across the air space between the dome portion of the manifold housing and the central portion of the cylinder housing to locate the central portion of the cylinder housing relative to the manifold housing.

7. An injection molding system as claimed in claim 6 wherein a valve pin bushing is located between the base portion of the manifold housing and the cylinder housing, the valve pin bushing having a central bore to snugly receive the valve pin therethrough, the valve pin bushing being fixed to the base portion of the manifold housing with the central bore of the valve pin bushing in alignment with the valve pin bore through the base portion, the valve pin bushing having second locating means extending across the air space between the base portion and the cylinder housing to engage the cylinder housing to laterally locate the manifold housing relative to the cylinder housing.

* * * * *